United States Patent [19]

Katz

[11] 4,262,577

[45] Apr. 21, 1981

[54] FASTENER

[76] Inventor: Jonathon H. Katz, 78 Cypress St., Brookline, Mass. 02146

[21] Appl. No.: 969,420

[22] Filed: Dec. 14, 1978

[51] Int. Cl.³ .............................................. F16B 13/04
[52] U.S. Cl. .................................. 411/15; 29/526 R; 411/360; 411/39
[58] Field of Search ....................... 85/3 R, 23, 63, 72, 85/79, 82, 83; 151/14.5, 23; 29/526

[56] References Cited

U.S. PATENT DOCUMENTS

| | | |
|---|---|---|
| 484,204 | 10/1892 | Huber et al. |
| 633,838 | 9/1899 | Harrison ................................ 85/23 |
| 772,118 | 10/1904 | Ahlvin ................................ 85/23 X |
| 1,248,006 | 11/1917 | Pleister ................................ 85/63 |
| 1,267,902 | 5/1918 | Pleister ................................ 85/88 |
| 1,318,584 | 10/1919 | Peirce ................................ 85/82 |
| 1,359,833 | 11/1920 | Osgood ................................ 85/63 |
| 1,646,457 | 10/1927 | Ogden ................................ 85/82 |
| 2,088,358 | 7/1937 | Adams ............................ 85/15 P X |
| 2,287,395 | 6/1942 | Reynolds ............................ 85/79 X |
| 2,588,860 | 3/1952 | Marks . | |
| 3,021,745 | 2/1962 | Libom ................................ 85/79 |
| 4,043,245 | 8/1977 | Kaplan ................................ 85/3 R |

FOREIGN PATENT DOCUMENTS

| | | | |
|---|---|---|---|
| 965848 | 6/1957 | Fed. Rep. of Germany ............. 85/79 |
| 10817 | 3/1924 | Netherlands ................................ 85/82 |
| 499397 | 1/1939 | United Kingdom ........................ 85/82 |

Primary Examiner—Thomas J. Holko

[57] ABSTRACT

A fastener for use with a connecting element such as a screw comprises a thickened head of a firm but plastic material, a shank, and a tail. The head and shank are first placed into a hole; then a connecting element such as a screw is inserted alongside of the head to cause the head to wedge into the wall of the hole and hold the screw tightly. In one aspect the shank and tail are connected by an indented portion that facilitates breaking away the tail and indicates the desired depth of insertion of the head, and in another aspect the head contains a second, harder material to facilitate the wedging action of the head.

13 Claims, 6 Drawing Figures

U.S. Patent  Apr. 21, 1981  4,262,577

FASTENER

FIELD OF THE INVENTION

This invention relates to fasteners for anchoring connecting elements such as screws and other threaded hardware in blind holes for mounting work materials to surfaces such as walls and ceilings.

BACKGROUND OF THE INVENTION

In the art of mounting work materials (such as plates and brackets) on anchoring surfaces such as walls and ceilings, it is known to use such devices as plastic shields and lead anchors to make screws grip tightly in blind holes in the anchoring surfaces. These devices are first placed into a hole in the anchoring surface, and then a screw is inserted into the shield or anchor forcing the shield or anchor material to expand against the hole and thereby tightening the fit of the screw in the hole. Problems with such devices are that the device often rotates within the hole in the anchoring material as it is tightened so that although the screw may tighten against the shield or anchor, it will not effectively tighten against the wall itself. Furthermore, stresses are often concentrated near the surface of the anchoring material, therefore making possible surface buckling and chipping. Normally one must match the size of the device closely to the size of the hole and screw. Finally, the normal method of using these devices is to put them on the anchoring surface before the work material is mounted thereon because they are normally of larger diameter than the holes in the work material. The work material is initially placed on the surface to determine where holes are to be made in the surface, but then must be removed while the devices are put in place.

It would be desirable to have a device that overcomes these problems and simplifies the mounting of work materials.

Pleister U.S. Pat. No. 1,248,006 describes a bolt anchor which is placed entirely within a hole and rests on one side of the bolt between the wall of the hole and the bolt with a thickened portion of the anchor adjacent to the tip of the bolt. Threads are preformed in the anchor.

Marks U.S. Pat. No. 2,588,860 shows a screw-hole liner of uniform thickness that is semi-cylindrical and is preshaped to the contour of screw threads.

Huber et al. U.S. Pat. No. 484,204 shows a nut lock that has an elastic locking finger that protrudes out of the hole of the nut after insertion of a uniformly sized locking portion into the nut through a groove therein.

SUMMARY OF THE INVENTION

I have discovered that problems associated with plastic shields, lead anchors, and other expansion fasteners can be overcome by providing a fastener that has a thickened head made of a firm but plastic material, a shank connected to the head, and a tail connected to the shank, mounting a work material on an anchoring surface with a hole in each aligned, placing the fastener into the aligned holes head first so that the head and shank are in the holes, and inserting a connecting element such as a screw or the like into the holes so that the connecting element wedges the fastener's head against the wall of the innermost hole to hold the connecting element tightly therewithin.

My invention also includes providing a frangible portion connecting the shank and tail of my fastener so that the tail can be broken away after the shank and head are firmly in place and so that the frangible portion can when level with the opening to the hole indicate the desired depth of insertion of the head. My invention further includes providing within the head a second, harder material to facilitate the wedging action of the head against the hole wall.

In preferred embodiments the fastener is made of plastic in one piece; the head is trapezoidal in shape and is tapered in transverse cross section as well; the head has a metal ball within it; and there are a pair of indentations one on each side of the fastener connecting the shank and the tail.

My invention is inexpensive, easy to make, easy to use, and provides effective tightening of connecting elements such as screws or the like without any slippage so that the connecting element can withstand substantial loads. The invention is useful for anchoring work materials onto a variety of anchoring surfaces. For relatively incompressible anchoring materials such as masonry, the invention can be used in new or existing holes. For relatively compressible anchoring materials such as wood, the invention can be used in reconditioning oversized or stripped holes. The invention adapts to a wide range of screw sizes and can be used with the work material already in place to save time and simplify alignment. The invention concentrates stress below the surface of the anchoring material for strength and to avoid surface buckling and chipping. The invention also provides a tight fit between a screw and the hole wall along the whole length of the screw. The fasteners of my invention can be made in one piece, resist rotating in the hole while being installed, allow a portion of the screw or other connecting element to grip directly the anchoring material on which the work material is to be mounted, and allow the work material to be held tightly against the surface of the anchoring material.

PREFERRED EMBODIMENT

I turn now to description of the structure and operation of a preferred embodiment of the invention, after first briefly describing the drawings.

DRAWINGS

DESCRIPTION

Figure 1:
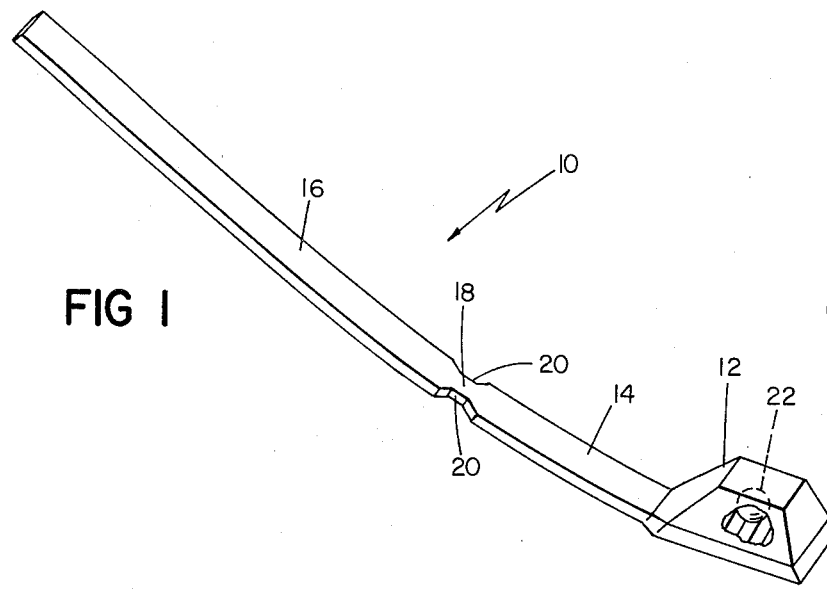
FIG. 1 is a perspective view, partly broken away, of the presently preferred embodiment of the invention.

FIG. 1 shows fastener 10, which comprises head 12, shank 14, and tail 16. Fastener 10 is made in one piece from nylon and is flexible along tail 16 and shank 14. Between connecting shank 14 and tail 16 is neck portion 18 formed by a pair of indentations 20 on each side of the fastener. Embedded in head 12 is aluminum ball 22. The longitudinal side faces of head 12 are trapezoidal as seen in FIG. 1. In cross section (FIG. 5) head 12 is also trapezoidal, the cross section having the appearance of two trapezoids back to back.

Regarding dimensions of the preferred embodiment, which are given for a ¼ inch hole and a No. Ten screw, fastener 10 is 2.7 inches long, tail 16 is 1.7 inches long, shank 14 is 0.70 inch long, and head 12 is 0.38 inch long. The upper face of head 12 is 0.20 inch long. Tail 16 and shank 14 are 0.10 inch wide, 0.03 inch thick, and 0.06 inch wide at the narrowest point between indentations 20. Ball 22 is 0.08 inch in diameter. In cross section (FIG. 5) the widest portion of head 12 is 0.22 inch, the upper trapezoidal portion has a taper of 68.5 degrees from the horizontal and the lower trapezoidal portion has a taper of 56.5 degrees from the horizontal.

OPERATION

Figure 5:
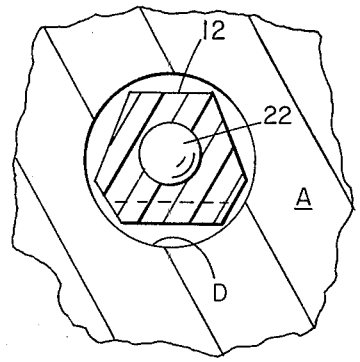
FIG. 5 is a sectional view through 5—5 of FIG. 2.
Figure 2:
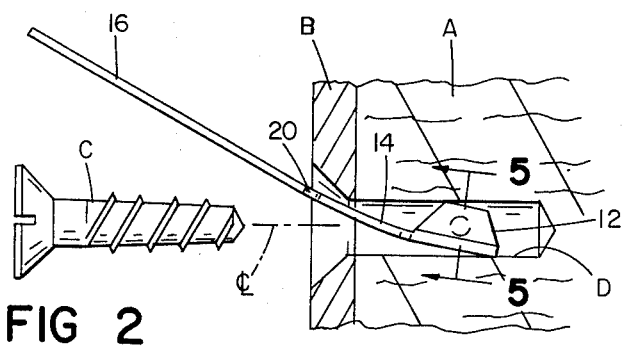
FIG. 2 is a view partly in section showing a step in the use of the embodiment of FIG. 1.
Figure 3:
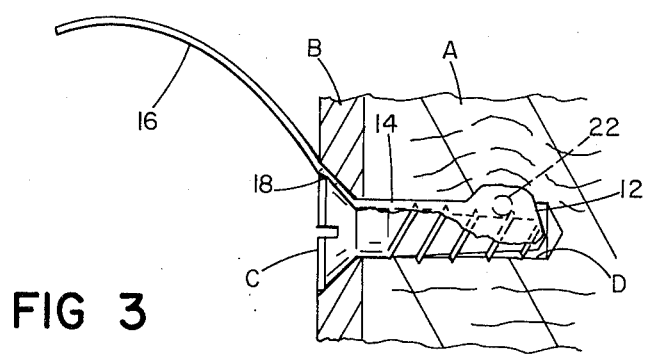
FIG. 3 is a view similar to FIG. 2 showing a second step in the use of the embodiment of FIG. 1.
Figure 4:
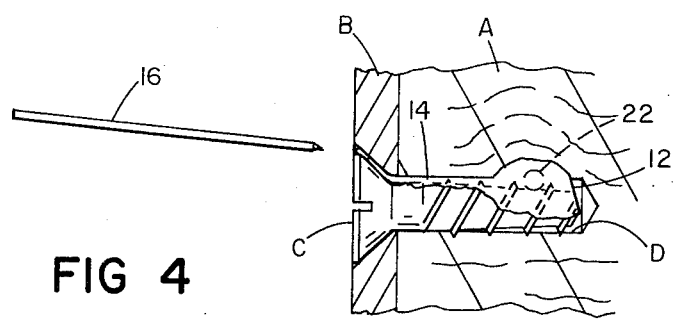
FIG. 4 is a view similar to FIGS. 2 and 3 showing a third step in the use of the embodiment of FIG. 1.

FIGS. 2 through 5 show the application of fastener 10 in an oversized or stripped hole in a compressible anchoring material, exemplified here by wood. To use fastener 10, one first places on the surface of wood anchoring material A a work material B and aligns holes in both, together designated D in FIG. 2 (the hole in wood A being oversized or stripped). One then grips tail 16 and thereby inserts head 12 into hole D until indentations 20 are just about even with the top of work material B, which is to be fastened to wood anchoring material A. Tail 16 is placed at an acute angle to the axis $C_L$ of hole D so that head 12 is cocked at an angle to that axis. A connecting element, namely, flat head screw C, is then inserted into hole D and hand tightened while one holds tail 16. Then tail 16 can be released and screw C further driven in with a screw driver until work material B is held snugly against the surface of anchoring material A. Head 12 in conjunction with shank 14 acts as an inclined plane or wedge under the driving action of screw C forcing head 12 outwardly against the wall of hole D where stresses are concentrated. Some of the plastic material of head 12 will flow around the periphery of screw C (FIG. 3). At the same time the work material B is pulled toward the surface of anchoring material A as screw C is held more tightly in hole D. Shank 14 is also pressed outwardly by screw C's shank to cause it to mold against the wall of the hole and against the shank. The portion of screw C that remains exposed bites directly into the wooden wall of the hole D in the anchoring material. Aluminum ball 22, which is harder than the surrounding nylon of head 12 but is itself flowable to some extent, assits in causing full and tight compression of head 12 into the space between screw C and the wall of hole D to cause screw C to be held tightly within the hole. As shown in FIG. 3, head 12 bulges into the wood anchoring material wall, causing some deformation of the wall. Inward driving of the screw causes tail 16 to thin out under the head of the screw. In FIG. 4, a tug on tail 16 causes it to break off at indentations 20, or the tail can be easily snipped off. The screw can be driven flush against the work material because the thinned out portion of the shank allows ready seating of the screw. As shown in FIG. 5 the trapezoidal cross-sectional shape of the upper portion of head 12 allows the upper face of head 12 driven against the hole wall to wedge in better than if it were much wider or much narrower. Although fastener 10 can be used for a wide range of hole sizes and screw sizes, the fit of the fastener in the hole as shown in FIGS. 2 and 5 may be regarded as preferable.

One convenient way of affixing a work material to an anchoring surface is to place the material on the surface, drill a hole through the material into the surface to permit installation of one fastener and screw, let the work material be held in place by the one screw so that the work material serves as a template for the alignment and drilling of additional holes into the surface, and then install the rest of the fasteners and screws in the additional holes.

Figure 6:
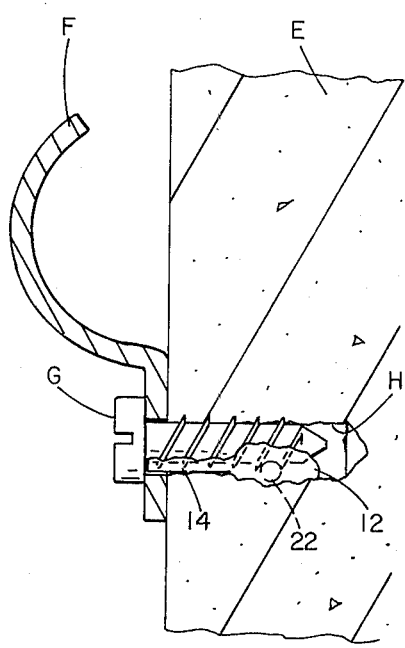
FIG. 6 is a view partly in section showing another use of the embodiment of FIG. 1 corresponding to the view of FIG. 4.

FIG. 6 shows the application of fastener 10 in a new or existing hole in a relatively incompressible anchoring material, exemplified here by concrete. When fastener 10 is used within a new or existing hole in concrete E (FIG. 6), head 12 does not form any significant indentation in the concrete but instead molds to the contour of the concrete and of the screw. In FIG. 6, a hook F for holding conduit is shown mounted by a pan screw G (non-tapering screws such as screw G are preferred over tapering screws such as screw C for use in my invention), and tail 16 has already been broken away. As in FIGS. 3 and 4, a portion of head 12 has flowed around the periphery of the screw to cover roughly one-half of it.

When a fastener having roughly the dimensions described above was tested, it required several hundred pounds of force to pull out the screw.

OTHER EMBODIMENTS AND MODIFICATIONS

Ball 22 could be made of another flowable metal such as zinc. Instead of ball 22, metal wire, either flat or round, could be used. If a flat wire is used, it should preferably be of a harder metal such as steel and should be angled in FIG. 2 from the rear part of the upper face of head 12 to the forward part of the lower face of head 12 for optimum jamming between the screw threads and the hole wall. Other plastics such as high durometer urethane and softer metals such as lead could also be used for fastener 10. The invention can also be used with non-threaded connecting elements such as nails. Other embodiments will occur to those skilled in the art.

What is claimed is:

1. A fastener for securing a wood or other self-tapping screw into a hole in a solid, non-hollow wall, said fastener comprising:

an enlarged head for wedging between one side of said screw and a corresponding side of the interior wall of said hole, so as to position said head transversely with respect to said screw, a shank connected to said head for extending from said head to the entrance to said hole, and a tail connected to said shank for extending outside of said hole, said head and shank each having two opposing, transversely-facing sides, a screw side facing said screw and a wall side facing the side of said hole wall against which said fastener is to wedge, said head protruding from the wall side of said shank to give said head a substantially thicker transverse dimension than said shank and to initially support the head end of said shank away from said engaged side of said wall and thereby incline said shank with respect to the longitudinal axis of said hole and thereby provide an inclined plane against which said screw can work during insertion, the wall side of said head being tapered in the transverse direction to facilitate wedging said head between said screw and wall, the length of said shank being selected to position said head deeply enough within said hole to prevent buckling of the surface of said wall when said screw is installed, the length of said head being less than that of said shank, said head and shank being constructed of a material firm enough to allow said head to be wedged between said screw and said hole wall but deformable enough to allow portions of said head to flow around and grip the threads of said screw, and the length of said tail being sufficient for said tail to be manually grasped outside said hole to initially hold said head at its proper depth and to initially hold said shank in its inclined position while said screw is installed.

2. The fastener of claim 1 wherein said head contains a single discrete element of greater hardness than the material of said head.

3. The fastener of claim 1 further comprising a frangible portion connecting said shank to said tail, said frangible portion being weaker than said shank and said tail for facilitating breaking away said tail from said shank.

4. The fastener of claim 3 wherein said frangible portion indicates the depth to which said head should be inserted into a hole when said frangible portion is level with the opening to said hole.

5. The fastener of claim 1 wherein said head contains therein a second material that is harder than said first material.

6. The fastener of claim 1 or 3 wherein said head contains therein a second material that is harder than said first material.

7. The fastener of claim 1 or 4 or 5 wherein said fastener is made of one-piece plastic and has at least one indentation in said plastic between said shank and said tail.

8. The fastener of claim 1 or 4 or 5 wherein said head has a trapezoidal shape.

9. The fastener of claim 5 wherein said harder material is metal.

10. The fastener of claim 9 wherein said metal is in the form of a ball.

11. The method of using a fastener to affix a work material having a first hole therethrough to a solid, non-hollow wall having a second hole therein by using a screw inserted into said holes, said fastener comprising an enlarged head for wedging between one side of said screw and a corresponding side of the interior wall of said hole, so as to position said head transversely with respect to said screw, a shank connected to said head for extending from said head to the entrance to said hole, and a tail connected to said shank for extending outside of said hole, said head and shank each having two opposing, transversely-facing sides, a screw side facing said screw and a wall side facing the side of said hole wall against which said fastener is to wedge, said head protruding from the wall side of said shank to give said head a substantially thicker transverse dimension than said shank and to initially support the head end of said shank away from said engaged side of said wall and thereby incline said shank with respect to the longitudinal axis of said hole and thereby provide an inclined plane against which said screw can work during insertion, the wall side of said head being tapered in the transverse direction to facilitate wedging said head between said screw and wall, the length of said shank being selected to position said head deeply enough within said hole to prevent buckling of the surface of said wall when said screw is installed, the length of said head being less than that of said shank, said head and shank being constructed of a material firm enough to allow said head to be wedged between said screw and said hole wall but deformable enough to allow portions of said head to flow around and grip the threads of said screw, and the length of said tail being sufficient for said tail to be manually grasped outside said hole to initially hold said head at its proper depth and to initially hold said shank in its inclined position while said screw is installed, and said method comprising the steps of:

placing said work material against said solid wall so that said first hole is aligned with said second hole, placing said fastener through said first hole into said second hole so that said enlarged head is placed in said second hole, said shank extends into said second hole, said tail protrudes out of said first and second holes, and said shank is inclined with respect to the axis of said hole to provide an inclined plane for said screw to work against, said head being placed deeply enough within said hole to prevent buckling of the surface of said wall when said connecting element is installed and said shank being placed at an inclination with respect to the longitudinal axis of said hole, grasping the protruding portion of said tail to hold said fastener in position, and inserting said screw into said holes along the inclined screw-engaging surface of said shank so that said screw, working against the inclined plane formed by said shank, wedges said head against the wall of said second hole and flows around and grips said screw, thereby to hold said screw tightly within said second hole.

12. The method of claim 11 wherein said fastener has a frangible portion connecting said tail to said shank, said frangible portion serving as an indicium of the insertion depth of said head when said frangible portion is level with the opening to said first hole, and further comprising the step of breaking off said tail from said shank at said frangible portion after said connecting element has been inserted and held tightly.

13. The method of claim 11 wherein said head contains a second material that is harder than said first material.

* * * * *